UNITED STATES PATENT OFFICE.

JOYE C. HAUN, OF TONOPAH, NEVADA, AND ALBERT SILVER, OF SAN FRANCISCO, CALIFORNIA.

PROCESS OF CYANIDING PRECIOUS-METAL-BEARING MATERIALS.

1,399,458.   Specification of Letters Patent.   Patented Dec. 6, 1921.

No Drawing.   Application filed December 4, 1920.   Serial No. 428,227.

*To all whom it may concern:*

Be it known that we, JOYE C. HAUN, a citizen of the United States, and a resident of Tonopah, Nevada, and ALBERT SILVER, a citizen of the United States, and a resident of San Francisco, California, have invented certain new and useful Improvements in Processes of Cyaniding Precious-Metal-Bearing Materials, of which the following is a specification.

The present invention relates to improvements in the cyanid treatment of precious metal ores for the recovery of the precious metal therefrom in a complete and economical manner, and has particular reference to the treatment of precious metal ores containing sulfid, which ores, according to methods commonly in use, have been found to be liable to produce a considerable loss of metal or an incomplete recovery of metal and considerable loss of cyanid solution. The cause of such loss has long been known to be the presence of sulfids in the ore under treatment, but heretofore it has not been possible to overcome this difficulty in a satisfactory manner.

In operating according to the present invention, we subject the ore to treatment with a cyanid solution containing a material which is capable of preventing any considerable amount of reprecipitation of precious metal in the form of sulfid from occurring. This result can readily be secured by the use of a substance which is alkaline in reaction and which is capable of decomposing sulfids with the liberation of hydrogen sulfid and this action is preferably assisted and supplemented by the presence of a compound capable of precipitating excess sulfids present or produced in the leaching solution. Of the materials which could be employed having the above mentioned properties, we have found that an alkali metal bicarbonate such as sodium bicarbonate, and a lead compound capable of reacting with sulfids to form lead sulfid can conveniently be employed.

The ore is, when treated in accordance with the preferred form of the present invention, agitated with a solution of a cyanid, for example sodium cyanid, which solution also contains sodium bicarbonate and litharge, the solution and pulverized ore being well agitated in order to dissolve the gold and silver. The leach solution is thereafter separated from the tailings and is subjected to any suitable operation for the precipitation and separation of the gold and silver content.

In treatment of ores of the character above specified, the quantity of cyanid and the concentration of the cyanid solution will, of course, depend to a large extent upon the character of the specific ore under treatment, and it is generally preferable to employ a solution which is rather dilute, a solution just strong enough to dissolve all of the precious metal being preferred, since high strength cyanid solutions lead to loss of cyanid. The solution may generally contain between 1 pound and 50 pounds of cyanid per ton of ore. The quantity of bicarbonate of soda to be employed likewise varies with the character of the ore under treatment, ores which are of an acid nature obviously requiring much more sodium bicarbonate than ores which are not of an acid nature; however in the case of ores or concentrates of a very acid nature the acid would be neutralized by the use of lime prior to the addition of bicarbonate of soda. Although the bicarbonate would serve the purpose of neutralizing the acidity of the ore, an economy would be effected by using a cheaper alkali for this. As hereinafter explained the chief function of the bicarbonate is not as a protective alkali, although in some cases serving this purpose. The amount of bicarbonate further depends to a considerable extent upon the percentage of sulfur existing in the ore in the form of sulfids of the precious metals, and ore containing small percentages of such sulfids requiring less bicarbonate than an ore comparatively rich in such sulfids. Sufficient bicarbonate must, of course, be used to break up the sulfids present in addition to the amount of bicarbonate which would react with the acid constituents of the ore. The amount of lead salt or lead compound to be employed varies depending upon the character of the ore and it may be noted that some varieties of precious metal ores already contain some lead compounds. A sufficient amount of lead compounds other than sulfids must be present either from the ore itself or added to the ore or to the leach liquor, to combine with all of the sulfids formed in the leaching liquor during the cyanidization of the operation.

The pulp or ore and cyaniding solution, as above described, is agitated in any convenient manner, for example agitation with a blast of air or agitation by mechanical stirrers at a temperature preferably between 80° F., and 120° F., until the available precious metal content of the ore has come into solution. The leach solution is then separated from the tailings in any suitable manner as by filtration, after which the liquor is subjected to any known or convenient operation for the precipitation of the precious metals.

The use of sodium bicarbonate and lead salt in conjunction with the cyanid solutions has the effects first of accelerating the dissolution of the precious metals, second the formation of a minimum percentage only of sulfo-cyanids in solution, thereby keeping the dissolving power of the solution at a maximum and keeping the reducing power of the solution at a minimum, third, a cleaner and more active working solution due to the prevention of the formation of soluble sulfur compounds, fourth, a higher recovery of precious metals due to the prevention of the formation of considerable quantities of artificial precious metal sulfids, fifth, the prevention of the accumulation of alkali metal sulfids in the leaching solution, all of which tend to improve the recovery of the precious metals from their ores.

As an explanation of the phenomena, the following is given. Presuming that the original ore contains silver in the form of sulfids and is treated with a solution as above described, there first occurs a breaking up of the sulfids of silver with the production of alkali metal sulfids in the solution. The alkali will immediately combine with dissolved metals present in accordance with the ratio of solubility of the sulfids of these metals. Since lead sulfid is much more insoluble than silver sulfid, the alkali metal sulfid will react with a lead compound mostly to form lead sulfid which will be precipitated. A part of the alkali metal sulfid also may react with the sodium bicarbonate forming $H_2S$ gas, which will be liberated from the solution, this, of course, being assisted by agitation and by currents of air blown through the liquor. The small quantity of silver sulfid which is so formed will by the continuation of the leaching action again be converted into cyanid of silver and alkali metal sulfid or hydrogen sulfid and the cycle of reactions will so repeat themselves.

The protection of silver from precipitation by sulfids which is afforded by the addition of lead salt is seen to be only partial, but on account of the cyclic nature of the reactions effected a sufficient quantity of the lead salt will effectively prevent the sulfids from keeping the silver in the insoluble condition in the ore. It appears also that in the process, there are other reactions taking place, one of these reactions perhaps being the joint action of sodium bicarbonate and sodium cyanid on the silver sulfid content of the ore, forming silver cyanid and hydrogen sulfid and normal sodium carbonate in a single reaction and this hydrogen sulfid so formed may in part escape from the liquor and in part react with lead present, so that only a small fraction of the sulfid so acted upon can again react with silver to produce an insoluble sulfid.

It will be understood that the process is applicable not only to ores direct, but also to concentrates and other materials containing precious metal in workable quantities.

For the purpose of more fully explaining and illustrating the mode of carrying the present invention into practice, we give the following examples, it being understood that these examples are given purely for the purpose of illustration and not as restricting the invention thereto. The specific amounts of the various materials are best figured out for each particular ore to be treated, based upon an analysis and assay of the ore under treatment.

*Example 1.*—This example illustrates the treatment of a gold and silver ore of average milling grade, the silver occurring as a sulfid. Naturally, an ore of this kind would have but a small percentage of sulfur, the greater portion of which would be in combination with the precious metals. 100 tons of an ore of the above type containing 15.0 ounces of silver and 0.20 ounce of gold after being crushed to pass a sieve having 80 meshes per linear inch, is agitated by means of a blast of air or other mechanical means for forty eight hours with 200 tons of a leach liquor containing 400 pounds of NaCN, 100 pounds of $NaHCO_3$, and 10 pounds of litharge. It is preferable, to satisfy the acidity in the ore with lime or some other cheap alkali compound prior to the addition of the $NaHCO_3$. This is usually done during the grinding operation. The liquor is maintained at a temperature of 100 deg. F. during the period above stated and the mass subjected to filtration or decantation to separate from the tailings the liquor containing the gold and silver.

*Example 2.*—This example illustrates the treatment of an ore or concentrate high in silver and gold, low in sulfids and high in acidity. This is given as an example of an ore originally containing pyrite, which has been weathered, during which operation the sulfid sulfur has been in part converted into sulfuric acid. This ore is one which contains naturally a substantial amount of oxidized lead compounds. 50 tons of ore of the above character containing 200 ounces of silver and 1.50 ounces of gold per ton after being crushed to pass a sieve having 100 meshes per linear inch, in 150 tons of a solution to which has been added 375 pounds of an alkaline cyanid and 500 pounds of CaO. To this mass is added 375 pounds of an alkaline cyanid and 100 pounds of $NaHCO_3$. It is not necessary to add lead compounds since the ore in this example already contains a sufficient amount of oxidized lead compounds for the purpose. The sulfid content of this ore is low, in fact is less than the amount which would be chemically equivalent to the active lead compounds in the ore. The liquor was maintained at about 90 deg. F. for 72 hours during which time the liquor and tailings were agitated by mechanical stirrers. At the end of the period stated substantially all of the gold and silver present were in solution and the liquor separated from the tailings by centrifugal filtration and the gold and silver were recovered from the liquor.

*Example 3.*—This example illustrates the treatment of a concentrate produced in a cyanid plant practising gravity concentration in cyanid solution. This concentrate is high in gold and silver and sulfids. The solution in which the concentration took place contained 3.0 pounds of sodium cyanid and 1.0 pound of CaO per ton of solution. This solution after separation from the concentrator tailings by decantation is used as stock solution for the treatment of the concentrates. Naturally, the process of concentration having taken place in a liquor containing an alkali, the products of concentration are no longer of an acid nature. The ore before concentration had been crushed to 80 mesh. 15 tons of concentrates, produced as above, containing 350 ounces of silver and 2.8 ounces of gold per ton are charged into a mechanical agitator with 30 tons of the above stock solution to which has been added 150 pounds of NaCN, 60 pounds of litharge, 200 pounds of $NaHCO_3$. The mass is subjected to mechanical agitation at a temperature of 110 deg. F. for a period of 24 hours. The solids are then allowed to settle and 20 tons of the leach liquor drawn off by decantation. Twenty tons of the stock solution previously mentioned, to which has been added 100 pounds of sodium cyanid, 75 pounds of $NaHCO_3$ and 15 pounds of litharge, is added to the mass to replace the decanted solution. The mass is again agitated for a period of 24 hours at a temperature of 110 deg. F. The solids are again allowed to settle and 20 tons of the leach liquor drawn off by decantation. Twenty tons of the stock solution previously mentioned are again added to the mass to replace the 20 tons decanted in the second decantation. To this solution there was added 50 pounds of NaCN, 15 pounds of litharge and 75 pounds of $NaHCO_3$. The mass is again subjected to agitation for 48 hours at a temperature of 110 deg. F. At the end of this last period the dissolution of the gold and silver is practically complete. The entire mass is combined with the tailings from the concentrators, which is undergoing cyanid treatment, and after a period of 48 hours' agitation the ore pulp is filtered and the solution containing the gold and silver recovered from the tailings. The solutions decanted in the cyanid treatment of the concentrates are combined with the solutions recovered by filtration for recovery of gold and silver.

We claim:

1. A process of treating precious metal bearing materials which compries subjecting such materials to the action of a solution containing a cyanid, a bicarbonate and a lead compound capable of combining with the sulfur of sulfids.

2. A process of treating precious metal bearing ore material which comprises agitating such ore material with a solution containing a cyanid and an alkali metal bicarbonate and a lead compound capable of reacting with sulfids and $H_2S$ to form lead sulfid, continuing the treatment of the ore material with such liquor until the precious metal content of the ore is substantially completely dissolved and then separating the solution from the tailings.

3. A process which comprises subjecting precious metal bearing ore material to the action of an alkaline solution containing a cyanid and containing a substance capable of decomposing precious-metal-sulfid, while in the presence of a compound of a non-noble-metal which compound is capable of precipitating sulfur of sulfids.

In testimony whereof, we have hereunto subscribed our names.

JOYE C. HAUN.
ALBERT SILVER.